United States Patent [19]
DeBell et al.

[11] Patent Number: 4,685,110
[45] Date of Patent: Aug. 4, 1987

[54] OPTICAL COMPONENT OF A LASER

[75] Inventors: Gary W. DeBell, Los Altos; David L. Wright, Rough and Ready; Kenneth A. Ruddock, Los Altos Hills; Alan B. Petersen, Palo Alto; Lee R. Carlson, Pleasanton; Marc K. von Gunten, San Jose, all of Calif.

[73] Assignee: Spectra-Physics, Inc., San Jose, Calif.

[21] Appl. No.: 770,717

[22] Filed: Sep. 3, 1985

Related U.S. Application Data

[63] Continuation-in-part of Ser. No. 654,305, Sep. 24, 1984.

[51] Int. Cl.$^4$ .............................................. H01S 3/08
[52] U.S. Cl. .................................... 372/103; 372/99; 372/101; 372/106
[58] Field of Search .................. 372/103, 98, 99, 101, 372/106; 252/387; 65/60.53; 106/286.6

[56] References Cited

U.S. PATENT DOCUMENTS 3,883,214 3/1975 Hoffman .............................. 372/103
4,063,803 12/1977 Wright ................................. 372/103

Primary Examiner—Robert E. Wise
Attorney, Agent, or Firm—Donald C. Feix; Paul Davis

[57] ABSTRACT

An optical component of a laser of the type including a hot gas plasma region, a cold gas region and producing large photon fluxed includes an optical element and a coating means on a surface of the optical element exposed to the photon fluxes. The coating means is comprised of a material adapted to minimize photoreduction of the optical element induced by exposure to the photon fluxes. Optical elements of the present invention include windows, birefringent plates, intra-cavity lenses, polarizers and mirrors.

61 Claims, 3 Drawing Figures

OPTICAL COMPONENT OF A LASER

This is a continuation in part application of copending U.S. patent application Ser. No. 654,305, filed Sept. 24, 1984, assigned to the same assignee.

BACKGROUND OF THE INVENTION

This invention relates to optical components of a laser, and more particularly, to optical components, such as windows, which are exposed to large photon fluxes in a cold gas region of a gas laser, and may suffer photoreduction as a result of exposure to the photon fluxes.

In almost all gas ion lasers there is a decrease in useful laser power output over the operating life of the laser. This decrease in useful power is accentuated by losses at optical elements, for example, window (or windows) of the laser tube.

With lasers that operate at high gain (such as lasers which lase at some visible light frequencies) losses from optical elements, especially windows, while undesirable, can often be tolerated during the operating life of the tube. However, even with such high gain lasers, eliminating or minimizing such losses is desirable. Eliminating or minimizing optical element (window) losses can extend the useful life of the tube and provide more efficient and precise operation of the tube during its useful life.

With lasers that lase at relatively low gain (such as a laser lasing at certain ultraviolet frequencies) a decrease in useful power, accentuated by losses at, for example, a window, can become very significant.

The plasma arc generated in the tubes of gas ion lasers can produce large photon fluxes which are capable of initiating physical and chemical changes on an optical element surface exposed to the fluxes. More particularly, these photon fluxes are capable of producing photoreduction of the exposed optical element surfaces.

Exemplary materials used for optical elements in such lasers includes but is not limited to crystalline $SiO_2$, Si, fused $SiO_2$, sapphire, diamond, BeO, $MgF_2$, ZnS, ZnSe, $BaF_2$, $CaF_2$, diamond like carbon, yttrium aluminum garnet (YAG), yttrium lithium fluoride (YLF), and the like. These materials often experience physical and chemical changes, particularly photoreduction, on the surface exposed to the photon flux. In the case of windows mounted at the end of a laser tube this occurs on the inside surface of the window. Other optical elements disposed within the interior of the tube itself also are subject to photoreduction.

It would be an advancement in the art to provide laser optical components which would not undergo photoreduction when exposed to large photon fluxes, particularly when the laser is one which generates ultraviolet radiation during operation. Such lasers produce ultraviolet radiation either incidental to or as a part of the beam and include noble gas ion lasers, excimer lasers, $CO_2$ lasers, free electron lasers, atomic metal vapor lasers, and the like.

SUMMARY OF THE INVENTION

Accordingly, it is an object of the present invention to provide laser optical components which do not undergo photoreduction when exposed to large photon fluxes generated in a laser.

Another object of the present invention is to minimize photoreduction changes on the inner surface of a window mounted at the end of a laser tube during operation of the laser.

Yet another object of the present invention is to minimize other physical and chemical changes induced on the surfaces of laser optical elements by photon fluxes.

Still another object of the present invention is to minimize photon flux induced photoreduction of optical elements associated with the cold gas region of a gas ion laser.

A related object of the present invention is to substantially increase the useful life of laser tubes by minimizing physical and chemical changes such a photoreduction on optical elements caused by photon fluxes.

Another object of the present invention is to enhance the radiation resistance of optical elements associated with the cold gas region of a gas ion laser.

The present invention is an optical component of a laser of the kind in which there is a hot gas plasma region and a cold gas region. Photon fluxes are produced during operation of the laser. An optical element is included which has at least one surface exposed to and in communication with the photon fluxes. A coating means is on the optical element surface exposed to the photon fluxes. The coating means is formed of a material adapted to minimize photoreduction of the optical element induced by the photon fluxes.

In another aspect of the present invention, an optical component operatively associated with a laser which transmits photon fluxes through a cold gas region, includes an optical element having at least one surface exposed to the photon fluxes. A coating is deposited on the exposed surface and chosen so its stoichiometry which does not substantially change when exposed to the generated photon fluxes.

In a further aspect of the present invention, a window construction is provided and mounted at the end of a laser tube of the kind in which large photon fluxes are generated during operation of the laser which are capable of initiating physical and chemical changes on a window surface exposed to the large photon fluxes. The window construction includes window means of transparent optical material for transmitting a laser light beam through the window means. Also included are radiation resistant and optically transparent coating means on the inner surface of the window means exposed to the large photon fluxes for preventing or minimizing physical and chemical changes on the surface during operation of the laser.

Advantageously, the present invention is applicable to optical elements associated with the cold gas region of a laser which generates ultraviolet radiation during laser operation. Exemplary lasers include nobel gas ion lasers, excimer lasers, $CO_2$ lasers, free electron lasers, atomic vapor lasers, and the like. The present invention provides a coating for optical element surfaces exposed to large photon fluxes resulting in a laser with a longer lifetime, more cost effective and has greater efficiency. The coating is selected to particularly minimize photoreduction effects caused by exposure to photon fluxes.

The present invention is not limited to windows but also includes other laser optical elements such as intracavity lenses, mirrors, birefringent plates, polarization elements, and the like.

The coating provides a number of useful functions. It minimizes photoreduction at surfaces exposed to the photon fluxes; enhances the radiation hardness of the optical element; and minimizes optical degradation which can result from either absorption of light radiation or phase front distortion of the exposed surface.

In one specific embodiment of the present invention the optical element is a window and more particularly a Brewster angle window. The window is part of a laser which lases in the ultraviolet frequency range and produces a relatively low gain. In this specific embodiment, the window material is crystalline $SiO_2$, and the coating is an oxide such as $Al_2O_3$. Further, in this specific embodiment, the coating is a thin layer of about 100 Angstroms in thickness.

Optical components and coating methods as described above and effective to function as described above comprise further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is partly broken away and in cross section to show certain component parts of the laser tube.

DESCRIPTON OF THE PREFERRED EMBODIMENTS

Figure 1:
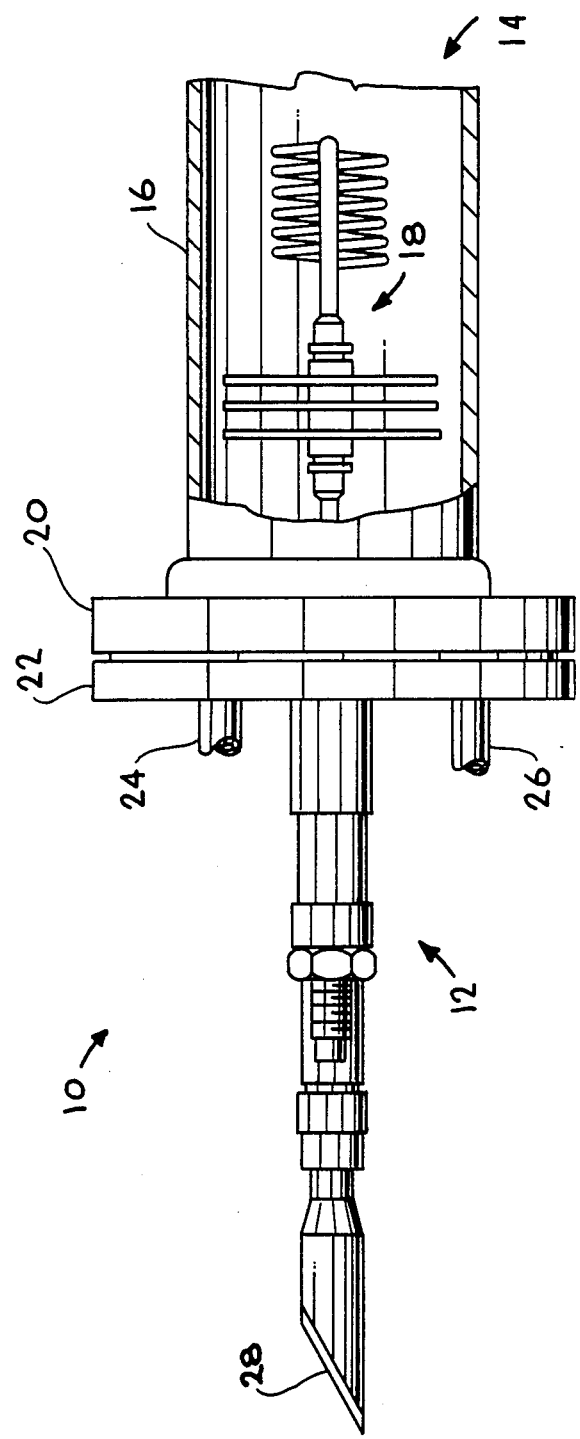
FIG. 1 is a side elevation view of one end of a laser tube of the kind with which the present invention may be used. As illustrated, a specific optical element, a window sealably mounted at the end of a laser tube, is shown.

In FIG. 1 a laser tube is indicated generally by the reference numeral 10.

The laser tube 10 as illustrated in FIG. 1 is a laser tube for a gas ion laser, and only one end of the tube is shown.

Laser tube 10 is essentially in two sections; a cold gas section denoted as 12; and a hot gas plasma section illustrated as 14. The present invention is utilized with a laser of the type in which ultraviolet radiation is generated either as part of the laser beam itself or as incidental radiation.

Hot gas is substantially found in plasma section 14 where a population inversion resulting in lasing action produces a laser beam of selected wavelength. This hot gas is essentially not found in cold gas section 12.

Although FIG. 1 illustrates an ion laser, it will be appreciated that the present invention is also suitable for other lasers in which high photon fluxes are generated. The present invention is suitable with the following types of lasers: noble gas ion; excimer; $CO_2$; free electron; atomic metal vapor; and the like. Additionally, the present invention can be employed with lasers having varied geometries such as ring and folded lasers.

Tube 10 includes a cylindrical member 16 and a cathode assembly 18. Again the hot plasma remains within cylindrical member 16 between cathode assembly 18 and an anode (not shown).

In the construction illustrated end flanges 20 and 22 provide a mounting arrangement for mounting a tube end assembly (cold gas section 12) onto the cylindrical member 16.

Flange 22 may include one or more connector assemblies 24 and 26 for connecting auxiliary equipment to tube 10, such as vacuum pumping, filling equipment units and the like.

As illustrated in FIG. 1, an optical element in the form of a window 28 is mounted at the end of cold gas section 12 of tube 10. Although FIG. 1 illustrates a window, the present invention is useful with other optical elements including but not limited to intra-cavity lenses, mirrors, birefrigent plates, polarizing plates, other polarizers and the like.

Window 28 is mounted at a Brewster angle in the specific embodiment illustrated in FIG. 1, but the present invention is not limited to windows or other optical elements which are mounted at a Brewster angle. Windows as well as other optical elements can be mounted at other angles.

Laser tube 10 has another electrode, an anode, at the end of the tube (not shown) in FIG. 1. A plasma arc is generated between cathode 18 and the anode. The plasma arc can produce large photon fluxes during operation of the laser. These large photon fluxes can be instrumental in causing a decrease in useful power output of the laser tube because of losses at optical components including but not limited to window (windows) of the tube. As defined herein a large photon flux is cumulative depending on photon energy, flux density and exposure duration. A range of about $10^{10}$–$10^{20}$ photons/sec can be considered large in view of the preceding factors as well as the particular application.

Figure 2:
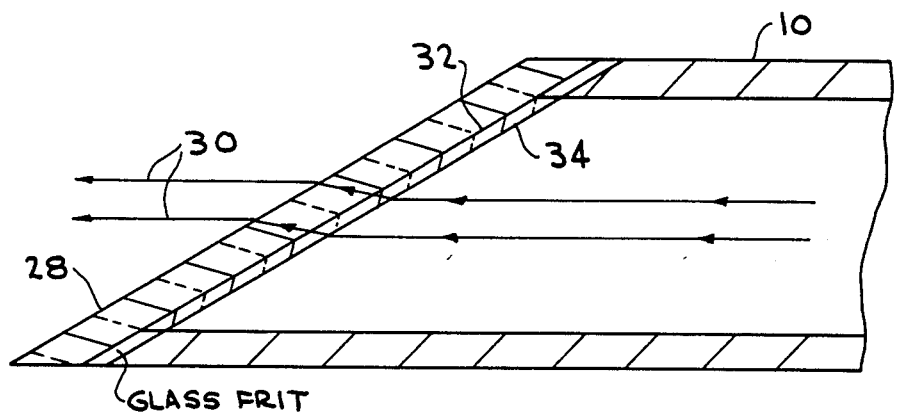
FIG. 2 is an enlarged view showing details of the window construction used in the laser tube of in FIG. 1.

The laser beam which is produced by laser tube 10 is indicated by the reference numeral 30 in FIG. 2.

Window 28 is mounted to tube 10 in one embodiment by a glass frit procedure in which a glass frit is disposed intermediate tube 10 and window 28. The actual mounting process is a conventional frit process sealed at high temperature of about 450° C.–550° C. Other mounting procedures are suitable including utilization of epoxy or cement, optical contacting, fusing, use of deformable gaskets, and the like. However, the standard frit procedure is the preferred.

Any loss in transmitting beam 30 through window 28 results in a loss in the useful power output of the laser.

Losses can occur at optical elements, including window 28, as a result of optical degradation. Damage to optical elements can result in absorption of light radiation or phase front distortions.

Optical degradation to optical elements can occur as a result of physical or chemical changes on surfaces of optical elements such as surface 32 of window 28, because this is the surface exposed to the large photon fluxes produced by the plasma arc during operation of the laser.

The physical and chemical changes induced by the photon fluxes are generally photoreduction of an optical element surface exposed to the fluxes. Throughout the remainder of this disclosure the physical and chemical induced changes shall be referred to as photoreduction changes.

The present invention minimizes photoreduction changes on exposed optical surfaces by enhancing its radiation resistance. This is achieved with the present invention by applying a radiation resistant and optically transparent coating 34 to an optical element surface which is exposed to photon fluxes, particularly in cold gas region 12.

Radiation resistant as used throughout this disclosure means that coating 34 undergoes no physical or chemical changes when exposed to ultraviolet radiation dosages generated during laser operation. Radiation resistant as the term is used is, additionally, subject to intensity and time parameters. That is, the greater the intensity of the photon flux in combination with a greater time period of flux exposure, the more radiation resistant the coating must be. In this regard, the term as applied to the present invention is subject to the qualification that coating 34 is radiation resistant under conditions under which the laser is operating. At extreme intensity and time conditions where a laser would not normally be required to operate, coating 34 may not be radiation resistant and suffer damage.

Coating 34 serves a number of useful functions and it is a material which does not change the optical properties of the optical element to any substantial extent. For example, it is transparent at the wavelength of interest. The refractive index of coating 34 is chosen to minimize reflection losses when the coating is applied, such as, for example, when a window is mounted at a Brewster angle.

Coating 34 is disposed on optical element surfaces exposed to large photon fluxes to minimize photoreduction that can occur at the surface. Additionally, coating 34 has a stoichiometry that does not substantially change when exposed to the photon fluxes. It serves to minimize the breakage of bonds at the exposed surface. Further, coating 34 does not itself substantially absorb the desired laser wavelength after or during exposure to the ultraviolet radiation. Stoichiometry as defined herein includes the conservation of matter and energy to chemical activity.

Suitable optical element materials include but are not limited to crystalline $SiO_2$, Si, fused $SiO_2$, sapphire, diamond, BeO, $MgF_2$, ZnS, ZnSe, $BaF_2$, $CaF_2$, diamond like carbon, yttrium aluminum garnet (YAG), yttrium lithium fluoride (YLF), and the like. The preferred material is crystalline $SiO_2$. Suitable coating materials are those which substantially minimize photoreduction of optical element surfaces. When disposed on an optical surface to be protected, these materials have low reflectivity, low optical absorption in the region where the laser operates, and have low scatter in the wavelength region where the laser operates. Preferred materials include oxides and fluorides. Exemplary coating materials include but are not limited to $Al_2O_3$, BeO, $Y_2O_3$, MgO, $B_2O_3$, $Sc_2O_3$, LiF, $NdF_3$, $ThF_4$, $MgF_2$, $Na_3AlF_6$, and the like. The most preferred materials are $Al_2O_3$ and BeO.

Significantly, coating 34 can be comprised of one layer or more such as a multilayer design. Coating 34 can comprise a layer of a first chosen material, a second layer of a second chosen material and so forth. When a multilayer structure is employed it is configured to satisfy minimum reflection losses of the combination of coated surface 32 and coating 34.

The materials selected for coating 34 and the coated surface 32 are chosen to reduce the absorption of contaminants of surface 32 which but for coating 34 would be subjected to photoreduction from exposure to photon fluxes.

The thickness of coating 34 can vary. It can be a thin film with a thickness above about 50 Angstroms. It can be applied in a half wave optical thickness (absentee layer) or as integral multiples of the half wave optical thickness.

Coating 34 is applied to optical elements by various means. In one embodiment it is applied to the desired surface (surfaces) by physical vapor deposition using any variety of applicators including but not limited to an electron beam gun, sputtering, and the like. In another embodiment it is applied by chemical deposition and can be applied by immersion in a chemical bath if the entire optical element is to be coated.

Figure 3:
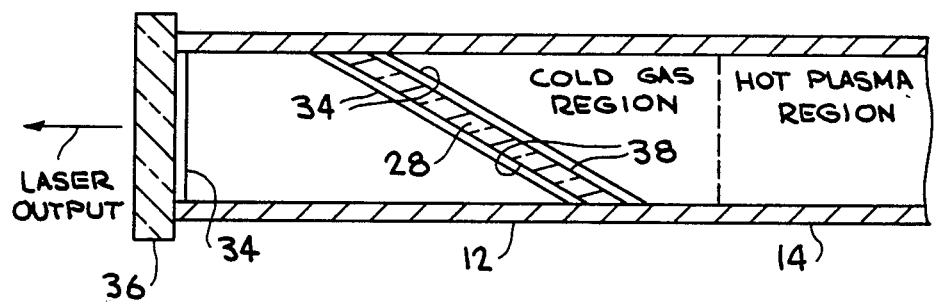
FIG. 3 is a block diagram of the cold gas region of an ion laser. Illustrated is a mirror sealably mounted at the end of the laser tube and a second optical element positioned within the interior of the cold gas region of the laser tube. The elements illustrated are not drawn to scale.

With reference now to FIG. 3, there is illustrated an optical element 28 positioned in the interior of laser tube 10, and more particularly in cold gas region 12. Throughout this disclosure the same reference numbers are used to denote the same or similar elements in each respective figure. As shown in FIG. 3, an optical element 28, such as a polarizing plate, birefingence plate, intra-cavity lens and the like, is coated on two opposing surfaces with coating 34. Optical element 34 may or may not be at Brewster angle. Both surfaces are coated when they are respectively in communication with the large photon fluxes produced and minimizing photoreduction at each surface is desired.

In another embodiment only one surface of optical element 28 is coated. Additionally, when both sides are coated, each side can be coated with the same materials, different materials, in different thicknesses and in multilayer structures on one or both sides.

With further reference to FIG. 3, at the end of tube 10 is a laser output mirror 36. Mirror 36 is mounted to tube 10 by a variety of conventional means including but not limited to frit sealing. Surface 38, exposed to the interior of tube 10, is coated with coating 34. It will be appreciated that optical elements such as mirror 36 can be comprised of multilayer structures.

The present invention finds application with lasers lasing in the ultraviolet, visible, infrared spectrums and the like.

In one specific embodiment of the present invention a window is mounted at a Brewster angle at the end of the cold gas region of a laser tube lasing in the ultraviolet frequency range. In this particular embodiment the window is made of crystalline $SiO_2$, and the coating material is $Al_2O_3$ coated to a physical thickness of about 100 Angstroms by physical vapor deposition.

A laser lasing in the ultraviolet frequency range operates at low gain, and losses at an optical element such as a window can result in the decrease of the useful power of the laser within a short period of time.

For example, the large photon flux can cause photoreduction of the surface of crystalline $SiO_2$. This is a reduction of $SiO_2$ to elemental Si along with other reduction products. If elemental Si is present on the surface it exhibits optical loss such as absorption, scattering, and the like at the lasing wavelength. Just a fraction of an atomic layer of elemental Si can absorb a significant amount of the light of a laser beam.

A coating such as $Al_2O_3$, BeO and the like, applies as a thin film or in half wave optical thickness (or integral multiples thereof), is effective to minimize photoreduction of $SiO_2$.

The coating material utilized is also a radiation hard material in the sense that it does not readily dissociate or change stoichiometry under the exposure to the large photon flux.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. An optical component of a laser, said laser having a hot gas plasma region, a cold gas region and photon fluxes generated therein, comprising:
   an optical element operatively associated with said laser having at least one surface exposed to and in communication with said photon fluxes; and
   a coating means on said optical element surface exposed to said photon fluxes, said coating means being formed of a material adapted to minimize photoreduction of said optical element induced by said photon fluxes and selected from the group consisting of $Al_2O_3$, BeO, $Y_2O_3$, MgO, $B_2O_3$, $Sc_2O_3$, LiF, $NdF_3$, $ThF_4$, and $Na_3AlF_6$.

2. The optical component of claim 1; wherein said optical element has more than one surface exposed to said photon fluxes.

3. The optical component of claim 1, wherein each surface of said optical element exposed to said photon fluxes is coated with said coating means.

4. The optical component of claim 1, wherein said coating means is an optically thin film.

5. The optical component of claim 1, wherein said coating means has a physical thickness greater than about 50 Angstroms.

6. The optical component of claim 1, wherein said coating means has a physical thickness of about 100 Angstroms.

7. The optical component of claim 1, wherein said coating means is applied to each optical element exposed surface at substantially a half wave optical thickness or an integral number of half wave optical thicknesses.

8. The optical component of claim 1, wherein said coating means is a multilayer film with each layer being made of a different substance.

9. The optical component of claim 1, wherein said optical element is a window on the end of a laser tube defining said cold gas region.

10. The optical component of claim 9, wherein said window is frit sealed to said laser tube.

11. The optical component of claim 9, wherein said window is a Brewster angle window.

12. The optical component of claim 1, wherein said optical element is positioned in an interior of said cold gas region and has two opposing surfaces with at least one surface exposed to said photon fluxes and said exposed surface having a coating means applied thereto.

13. The optical component of claim 1, wherein said optical element is an intra-cavity lens.

14. The optical component of claim 1, wherein said optical element is a birefringent plate.

15. The optical component of claim 1, wherein said optical element is an internal plate polarizer.

16. The optical component of claim 1, wherein said optical element is a mirror.

17. The optical component of claim 1, wherein said optical element is made of a material which minimizes breakage of chemical bonds of said element induced by said photon fluxes.

18. The opical component of claim 1, wherein said optical element is made of a material selected from the group consisting of crystalline $SiO_2$, Si, fused $SiO_2$, sapphire, diamond, BeO, $MgF_2$, ZnS, ZnSe, $BaF_2$, $CaF_2$, yttrium aluminum garnet (YAG), and yttrium lithium fluoride (YLF).

19. The optical component according to claim 1, wherein said coating means is an oxide.

20. The optical component according to claim 1, wherein said coating means is a material which has low reflectivity, low optical absorption and low scatter in the spectrum where said laser operates.

21. The optical component according to claim 1, wherein said coating means is adapted to minimize changes or alterations to optical phase fronts occuring after exposure to said photon fluxes.

22. The optical component of claim 1, wherein said optical element and coating means are selected to reduce the adsorption of contaminants of an optical element surface which is coated with said coating means.

23. The optical component of claim 1, wherein said coating means is made of $Al_2O_3$ or BeO.

24. The optical component of claim 1, wherein said coating means is made of $Al_2O_3$.

25. The optical component of claim 1, wherein said optical element is a Brewster angle window attached to an end of a laser tube at the cold gas section with an inner surface communicating with said cold gas section, said coating means being a thin layer of $Al_2O_3$, said window being made of crystalline $SiO_2$, and said laser is a gas ion laser.

26. An optical component operatively associated with a laser generating photon fluxes in a cold gas region, comprising:
   an optical element mounted to said laser and having at least one surface exposed to said photon fluxes; and
   a coating deposited on said exposed surface, said coating layer being made of a material having a stoichiometry which does not substantially change when exposed to said photon fluxes and selected from the group consisting of $Al_2O_3$, BeO, $Y_2O_3$, MgO, $B_2O_3$, $Sc_2O_3$, LiF, $NdF_3$, $ThF_4$, and $Na_3AlF_6$.

27. The optical component of claim 26, wherein said laser is of the type which generates ultraviolet radiation during laser operation.

28. The optical component of claim 26, wherein said laser is an ion laser.

29. The optical component of claim 26, wherein said coating is a thin film greater than about 50 Angstroms in physical thickness.

30. The optical component of claim 26, wherein said coating is a thin film of about 100 Angstroms in physical thickness.

31. The optical component of claim 26, wherein said coating comprises a plurality of distinct layers each formed of a different material.

32. The optical component of claim 26, wherein said coating has a thickness of a half wave optical thickness or an integral number of half wave optical thicknesses.

33. The optical component of claim 26, wherein said optical element is a window attached to an end of a laser tube with a window surface exposed to said photon fluxes in said cold gas region.

34. The optical component of claim 33, wherein said window is a Brewster angle window.

35. The optical component of claim 26, wherein said optical element is positioned in an interior of said cold gas region.

36. The optical component of claim 26, wherein said optical element is a polarizing plate.

37. The optical component of claim 26, wherein said optical element is an intra-cavity lens.

38. The optical component of claim 26, wherein said optical element is a birefringent plate.

39. The optical component of claim 26, wherein said optical element is a mirror.

40. The optical component of claim 26, wherein said optical element has more than one surface coated with said coating.

41. The optical component of claim 26, wherein said coating is deposited on said optical element by physical vapor deposition.

42. The optical component of claim 26, wherein said coating is deposited on said optical element by chemical deposition.

43. The optical component of claim 26, wherein said optical element is made of a material selected from the group consisting of crystalline $SiO_2$, Si, fused $SiO_2$, sapphire, diamond, BeO, $MgF_2$, ZnS, ZnSe, $BaF_2$, $CaF_2$, yttrium aluminum garnet (YAG), and yttrium lithium fluoride.

44. The optical component of claim 26, wherein said coating is an oxide or fluoride.

45. The optical component of claim 26, wherein said coating is $Al_2O_3$ or BeO.

46. The optical component of claim 26, wherein said optical element and coating means are selected to reduce the adsorption of contaminants of an optical element surface which is coated with said coating means.

47. A window construction for mounting at an end of a laser tube of the kind in which large photon fluxes are generated during operation of the laser and are capable of initiating physical and chemical changes on a window surface exposed to such large photon fluxes, said window construction comprising,
    window means of transparent optical material for transmitting a laser light beam through the window means, and
    radiation resistant and optically transparent coating means on the inner surface of the window means exposed to the large photon fluxes for preventing or minimizing physical and chemical changes on said surface during operation of the laser, said coating means being formed of a material selected from the group consisting of $Al_2O_3$, BeO, $Y_2O_3$, MgO, $B_2O_3$, $Sc_2O_3$, LiF, $NdF_3$, $ThF_4$ and $Na_3AlF_6$.

48. The window construction of claim 47 wherein the coating means is a very thin layer for minimizing absorption and reflection losses between the coating means and the window means.

49. The window construction of claim 47 wherein the window is a Brewster angle window.

50. The window construction of claim 47 wherein the coating means has a refractive index selected so as to minimize reflection losses between the window means and the coating means.

51. The window construction of claim 47 wherein the window is a Brewster angle window.

52. The window construction of claim 47 wherein the window means and the coating means are selected so as to reduce the adsorption of contaminants on said inner surface of the window.

53. The window construction of claim 47 wherein the window is a Brewster angle window.

54. The window construction of claim 47 wherein the window means is crystalline $SiO_2$.

55. The window construction of claim 47 wherein the coating means is a material which absorbs a significant part of the photon fluxes which causes physical and chemical changes to the window surface and is a material which does not dissociate under the action of such photon fluxes, and which thereby prevents this part of the photon fluxes from reaching the window surface.

56. The window construction of claim 55 wherein the window means is crystalline $SiO_2$.

57. The window construction of claim 47 wherein the window means is crystalline $SiO_2$ and the coating means is $Al_2O_3$.

58. The window construction of claim 47 wherein the window is a Brewster angle window.

59. The window construction of claim 47 wherein any window degradation over time can result in decreased laser output power undesired phase front distortion and wherein the window construction is a Brewster angle window, the window means is a crystalline $SiO_2$ material, and the coating means is applied in a thin layer in the range of about 100 Angstroms in physical thickness.

60. A method of preventing or minimizing physical or chemical changes on an inner surface of a window mounted at an end of a laser tube of the kind in which a large photon flux is generated during operation of a laser and is capable of initiating physical and chemical changes on a window surface exposed to such large photon flux, said method comprising,
    construction the window of transparent optical material for transmitting a laser light beam through the window, and
    coating the inner surface of the window with a radiation resistant and optically transparent coating of a material which is effective to prevent or minimize physical or chemical changes on said surface of the window during operation of the laser, said coating being made of a material selected from the group consisting of $Al_2O_3$, BeO, $Y_2O_3$, MgO, $B_2O_3$, $Sc_2O_3$, LiF, $NdF_3$, $ThF_4$ and $Na_3AlF_6$.

61. The method of claim 60 wherein the window is a Brewster angle window.

* * * * *